Jan. 2, 1962 V. H. PEOPLES ETAL 3,015,416
SPREADER CONSTRUCTION
Original Filed March 20, 1957 3 Sheets-Sheet 1
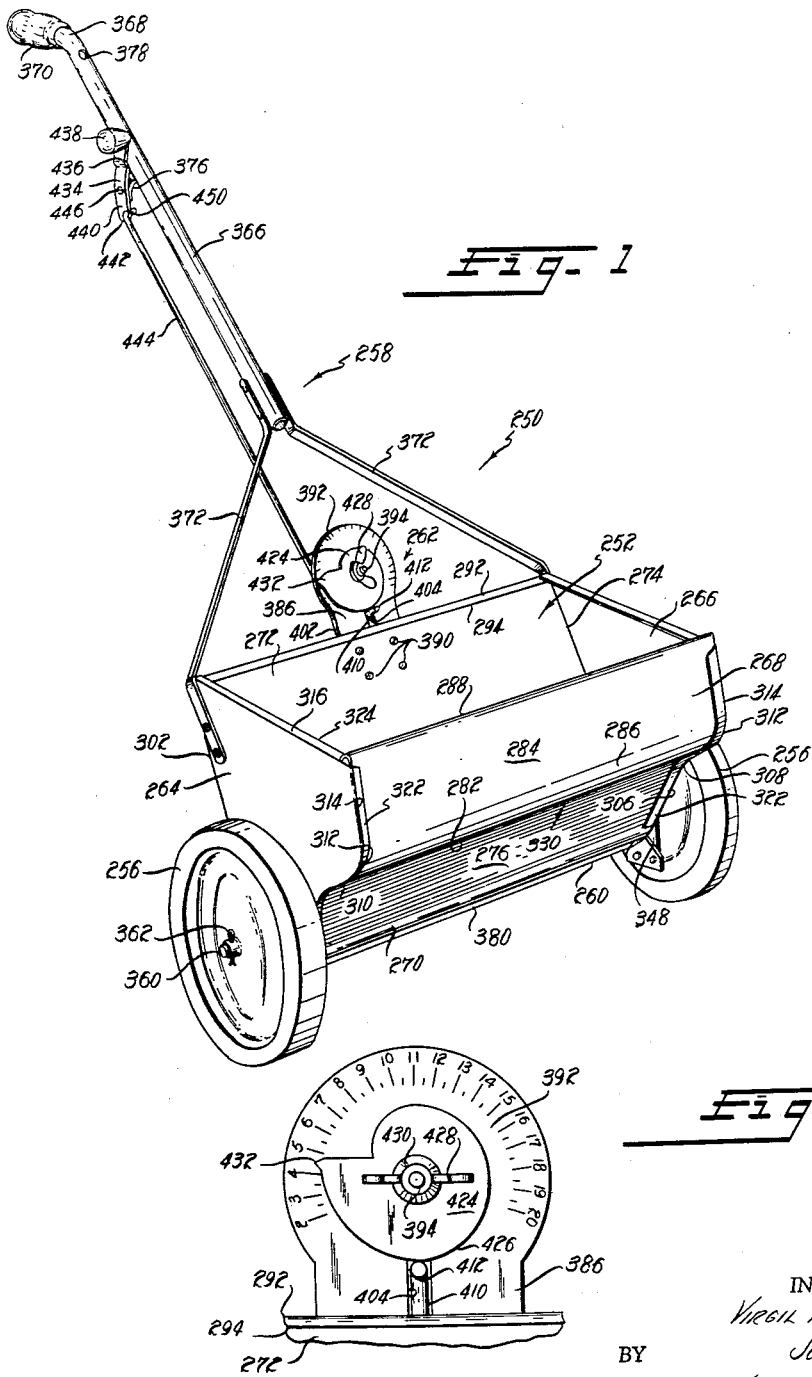
INVENTORS
VIRGIL H. PEOPLES
JOHN R. WEST
BY
Strauch, Nolan & Neale
ATTORNEYS

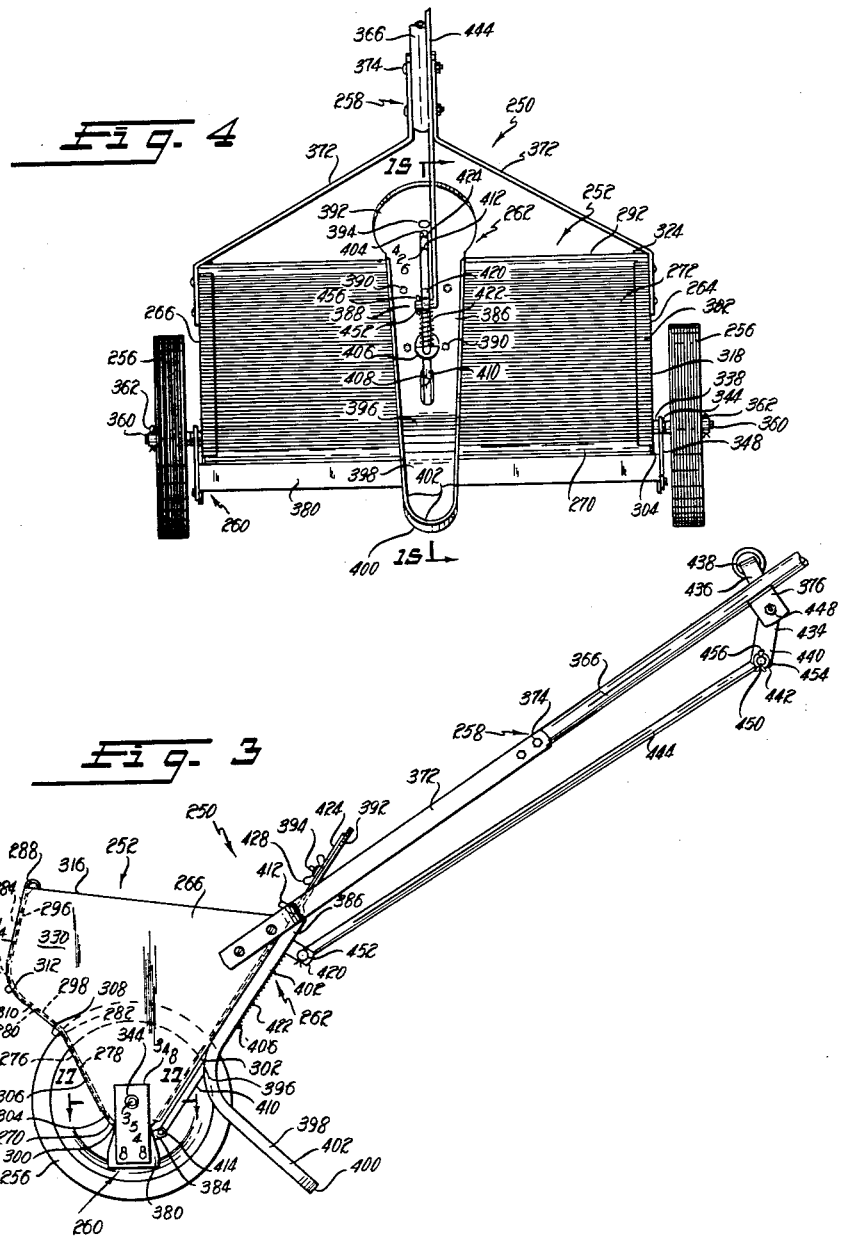

Jan. 2, 1962  V. H. PEOPLES ETAL  3,015,416
SPREADER CONSTRUCTION
Original Filed March 20, 1957  3 Sheets-Sheet 3
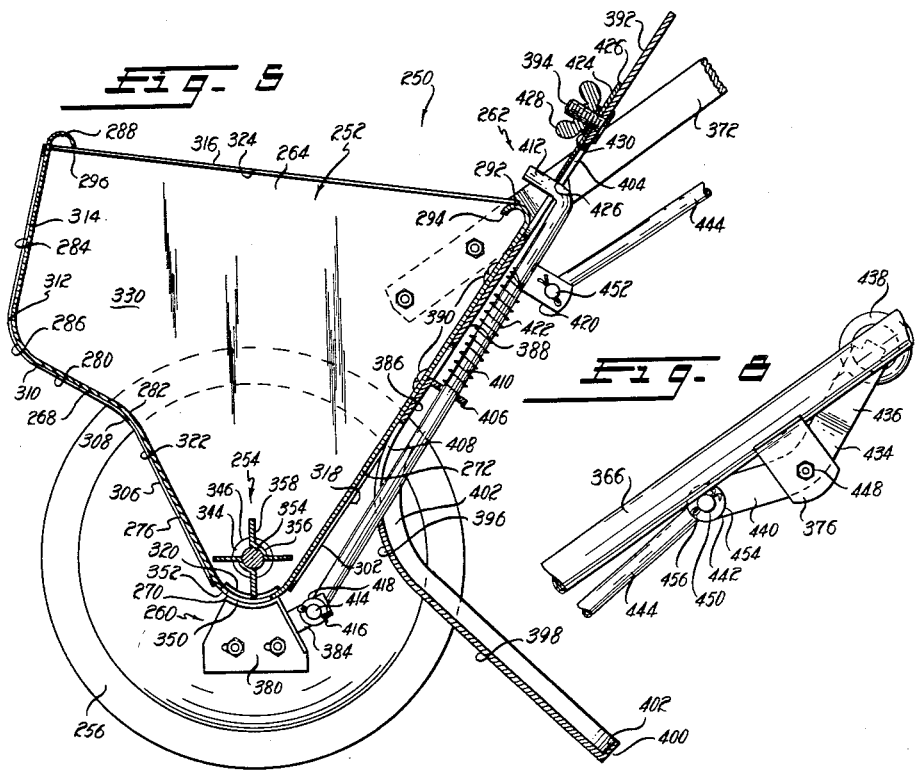
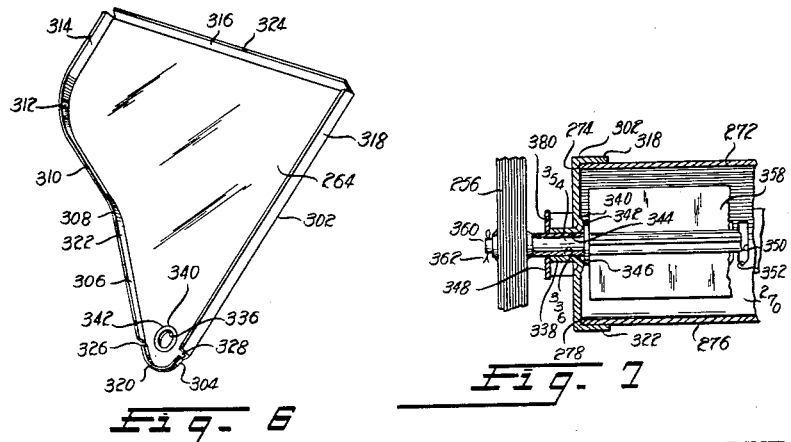
INVENTORS
Virgil H. Peoples
John R. West
BY
Strauch, Nolan & Neale
ATTORNEYS

United States Patent Office 3,015,416
Patented Jan. 2, 1962

1

3,015,416
SPREADER CONSTRUCTION
Virgil H. Peoples and John R. West, Marysville, Ohio, assignors to The O. M. Scott & Sons Company, Marysville, Ohio, a corporation of Ohio
Original application Mar. 20, 1957, Ser. No. 647,229. Divided and this application Jan. 22, 1959, Ser. No. 788,366
14 Claims. (Cl. 222—41)

This invention relates to spreader construction and is particularly related to material distribution devices known as spreaders having self contained storage means with mechanism for controlled distribution of various materials such as grass seed, fertilizer, lawn treatment chemicals and the like. This application is a division of United States application Serial No. 647,229, filed March 20, 1957.

There is a consumer demand for small inexpensive spreaders, which are made of lightweight material and normally have simple rate controls mounted on the handle structure in order to remain competitive in a low priced field.

To meet competition, it is essential that the cost of control structure be kept as low as possible. New inventive concepts in the support and distribution control mechanism aid in producing an inexpensive, lightweight yet rugged and conveniently controllable spreader, nevertheless, proven control principles disclosed in United States Reissue No. 24,189 are desired and have been used in a new combined support and adjustable rate and distribution control structure. By extending the rate control support structure to serve as a single support leg, material, production and assembly costs are greatly reduced. Mounting of the rate adjustment mechanism on the hopper where handle deflection, which is almost invariably present in spreaders, cannot affect outlet opening and use of the desirable overcenter locking in the control member for opening and closing the outlet, is now provided by inexpensive structure, which enables a competitive advantage in the low priced field. Small spreaders, on the market today, lack the strength, capacity, positive control and assured adjustment of a small spreader constructed in accord with principles of this invention.

Accordingly, a primary object resides in the provision in a spreader of a novel control incorporated with spreader support structure in a novel manner.

Still another object resides in the provision of a novel spreader control and distribution rate adjustment mechanism mounted on the spreader hopper and utilizing an overcenter locking movement spring biased to maintain the outlet control in closed or adjusted open position. Control components are simplified and a novel convenient rate adjustment is provided.

A further object resides in the provision on a controllable material distribution spreader of a novel combined leg and resiliently biased adjustable rate outlet control mechanism.

Further novel features and other objects of this invention will become apparent from the following detailed description, discussion and the appended claims taken in conjunction with the accompanying drawings showing preferred structures and embodiments, in which:

FIGURE 1 is a front perspective view of a spreader embodying construction in accord with this invention;

FIGURE 2 is an enlarged detail front view illustrating the adjustable cam of the rate mechanism of the spreader of FIGURE 1;

FIGURE 3 is a side elevation of the spreader of FIGURE 1 with the near wheel deleted to show hopper and control details;

FIGURE 4 is a rear elevation view of the spreader of

2

FIGURE 1 illustrating the combination hopper leg and control structure;

FIGURE 5 is an enlarged detail section taken on line 5—5 of FIGURE 4 illustrating the control linkage to the hopper discharge;

FIGURE 6 is a perspective detail view illustrating the inside of a side plate used for the spreader of FIGURE 1;

FIGURE 7 is a section taken on line 7—7 of FIGURE 3 illustrating the agitator axle opening and bushing; and FIGURE 8 is a detail side view of the control lever of the spreader in FIGURE 1 in a closed shutter position illustrating the lower lever arm in limited position past a dead center between the lever pivot and shutter pivot.

FIGURES 1-8 illustrate an adjustable, controllable rate, material spreader 250 having a hopper 252 which utilizes a front wall bulge and associated control concepts in accord with the invention. Spreader 250 comprises the hopper 252, an agitator assembly 254, wheels 256, handle assembly 258, a shutter plate assembly 260 and a combination separable support leg and rate adjustment assembly 262.

Hopper 252 is made with three pieces, two side plates 264 and 266 and a single piece comprising the front wall 268, bottom 270 and rear wall 272. Seen in FIGURES 3 and 4, the rear wall 272 is planar, has straight side edges 274 and with the lower portion 276 of front wall 268, which is also planar with straight side edges 278, are convergent downwardly at an acute angle. Bottom wall 270 integrally joining the front and rear walls 268 and 272, has a curved contour of circular longitudinal section (FIGURE 1) and with the convergent front wall portion 276 and rear wall 272 provide a curved bottom lateral straight trough.

With respect to front wall 268 (FIGURE 3), an intermediate wall portion 280 of planar form is inclined forwardly along a lateral bend line 282 of small radius curvature. The inclination of an upper planar portion 284 is reversed from that of intermediate portion 280 and directed rearwardly relative to a median plane between the lowermost inclined front wall portion 276 and rear wall 272. A lateral bend section 286 of larger radius curvature than bend line 282 provides the transition between the intermediate and upper front wall portions 280 and 284. The top lip 288 of front wall 268 curves to the rear and downwardly terminating in a lateral edge 290 which overhangs the interior of hopper 252. Similarly the top lip 292 of rear wall 272 curves forwardly and downwardly terminating in a lateral edge 294 which overhangs the interior of hopper 252.

Spreader 250 has side plates 264 and 266 which have a planar configuration (FIGURES 4 and 6). In this respect each of the left and right hand sets of the side edges 296 of upper front wall portion 284, the side edges 298 of intermediate front wall portion 280, lower front wall side edges 278, bottom wall side edges 300 and rear wall side edges 274, lie in a common vertical plane. Hence the joinder line between each of side plates 264 and 266 and the single piece front, bottom and rear wall lies in a vertical plane.

The side plates have a straight rearwardly inclined rear edge 302, circularly curved bottom edge 304, lower straight forwardly inclined front edge 306, forwardly curved edge 308, intermediate forwardly inclined straight edge 310, reversely curved edge 312, rearwardly inclined upper straight front edge 314 and an essentially horizontal straight top edge 316 between the front and rear edges 314 and 302.

Integral with rear edge 302 is an inwardly bent flange 318 which fits outside of and is welded adjacent to the rear wall side edge 274. A shallow flange 320 is turned in from the side plate bottom curved edge 304, and fits inside the edge of and is welded to the curved bottom wall 270. A continuous front flange 322 is turned in from the side plate front edges 306, 308, 310, 312 and 314 and is disposed outside of and welded to the front wall 268. Thus the front, bottom and rear edges of side plates 264 and 266 in assembly are essentially contiguous with the side edges of front, bottom and rear walls 268, 270 and 272, and the welded joinder constitutes an essentially unbroken line of compound bends and curves providing a high strength hopper construction.

The entire extent of side plate top edges 316 have inturned flanges 324, the rear end of which is disposed over the inturned upper edge lip 292 of rear wall 272 and the front end of which is disposed under the edge 290 of the front wall upper lip 288. Notches 326 and 328 are provided between the lower circular flange 320 and each of side plate front and rear flanges 322 and 318 to permit the aforementioned external disposition of the front and rear flanges and internal disposition of circular bottom flange relative to the front, bottom and rear hopper walls.

The aforementioned construction results in a hopper 250 having a forward wall bulge 330. It does not have externally projected joinder or top edge flanges and thus utilizes the maximum overall hopper dimensions to furnish increased hopper capacity and eliminates external protrusions having sharp edges which could snag objects. Upper front wall lip 288 extends higher than the level of the top of side edges 316, providing a front wind deflector, and all of the hopper top edges overhang its interior to help retain windblown particles of contained material and to prevent upsurging overflow due to agitator action.

At the approximate radial center of the lower circularly curved end of each side plate, an opening 336 (FIGURE 6) with an externally extruded axially disposed flange 338 (FIGURE 4) is formed. A circular portion 340 of the side plate is recessed around and immediately adjacent each annular flange 338 to provide an inset abutment surface 342 and to provide added wall strength around the associated opening 336. A radially flanged bushing 344 is disposed in each opening 336 with its flange 346 on the inner side of the hopper. The bushings project beyond the side plate annular opening flanges 338 and provide pivotal support for depending apertured shutter bracket plates 348 which hang adjacent the side plate annular flanges 338 and are part of the shutter assembly 260 to be later described.

A lateral row of elongate apertures 350 in the hopper bottom wall 270 provide a material outlet. The edges 352 of the front ends of apertures 350 are convergent as shown in FIGURE 7.

Agitator assembly 254 (FIGURE 5) consists of a shaft 354 with two sets 356 of dual, laterally extending vanes 358 welded thereto. Each vane 358 extends from shaft 354 along a plane through the shaft axis. The ends 360 of shaft 354 extend beyond the sides of vanes 358 and project through and beyond side plate bushings 344 to rotatably journal the agitator assembly 254 within the hopper 252 adjacent its curved bottom wall 270. The rotational path of the radially outer edges of vanes 358 has a very slight clearance above the inner surface of bottom wall 270, and the vanes 358 extend laterally between side wall bushing flanges 346 with a free running clearance. It is to be understood that the agitator could be one with a plurailty of winged blades on each vane, as in aforementioned Reissue Patent No. 24,189, the blades being aligned with the apertures 350.

In this embodiment the bushings 346 and side plates 264 and 266 are assembled on shaft 354 of agitator assembly 254 and are then welded to the front, bottom and rear walls 268, 270 and 272. Shutter support plates 348 are then hung on the bushings 346 and the ground engaging wheels 256 mounted on the projected ends 360 of agitator shaft 354. One or both of the wheels 256, as desired, may be non-rotatably keyed as by a cotter pin 362 to shaft 354 to transmit wheel rotation to the agitator assembly 254.

Wheel driven rotation of the agitator assembly 254 causes vanes 358 to sweep down adjacent the front wall 268, from front to rear across the apertures 350 and up adjacent the rear wall 272.

The handle assembly 258 is made with an upper tubular handle bar 366, with an end handle 368 inclined rearwardly a grip 370 on handle 368 and two identical strap iron yoke members 372 secured to the lower end of handle bar member 366 as by bolts and nuts. Yoke members 372 are bent to bracket the upper rear hopper corners and are secured to the hopper side plates 264 and 266 by bolts 374 and nuts. A depending apertured bracket 376 is fastened as by welding to the tubular handle bar 366 intermediate its ends, the bracket being offset toward one side of handle bar 366, for a purpose to be later described. In FIGURE 1, the upper side of bar 366, adjacent bent end 368, has a hole 378 formed to facilitate hanging the spreader 250 during storage.

*Combined discharge control and hopper support*

Shutter plate 380 (FIGURES 3 and 5) is contoured to have a snug pivotably fit below hopper bottom 270 and is adjustably fastened through screws, nuts and slots at each end (FIGURE 4) to the pivotable shutter side brackets 348 to swing over and cooperate with the lateral row of apertures 350. An apertured bracket 384 is centrally secured, as by welding, to the rear side of shutter plate 380.

Positive, adjustable, discharge rate control through variable, pivotable positioning of shutter 380 over apertures 350 is enabled by the combination support leg and rate control assembly 262 (FIGURES 3, 4 and 5). Assembly 262 is a separable preassembled unit which is designed for simplifying accurate installation on the hopper rear wall 272 midway between wheels 256. This arrangement enables disassembled shipment in a smaller container than would be necessary if the rate mechanism were fixedly secured to the hopper before shipment.

The support structure 386 for the rate mechanism is a single piece of sheet metal having a wide, flat, elongate portion 388 which engages and enables support 386 to be secured to the hopper rear wall 272 by four bolts and nuts 380. The upper end of the flat elongate portion 388 projects above the rear wall upper lip 292 and terminates in a circular platform 392. A forwardly extended threaded stud 394 is projected through the center of and welded to platform 392.

Below the lowermost mounting bolts 390, the flat portion 388 changes, through a curved leg portion 396, to a rearwardly inclined support foot 398 terminating in rounded end 400. The single piece support 386 includes an integral continuous rearwardly directed edge flange 402 extending from adjacent the circular platform 392 at the upper end, down the edges of the flat portion 388, the curved leg portion 396, the support foot 398 and around the end 400. Flange 402 provides necessary rigidity for support 386, enabling it to serve as both the rate control bracket and as the hopper support leg. Furthermore, being rigidly secured to the hopper rear wall 272, the wide flanged support 386 increases rear wall rigidity.

A vertical slot 404, formed in the platform portion 392 immediately below and aligned with stud 394, extends to a position approximately adjacent the hopper rear upper lip 292. The lower part of the elongate flat portion 388 has a partial cutout from which is formed a rearwardly disposed apertured lug 406, shown in FIGURE 4 in vertical alignment with the upper slot 404. A lower elongate slot 408 is formed in the upper part of the curved leg portion 396 and is in alignment with lug 406, upper slot 404 and stud 394 (FIGURE 4).

Disposed upwardly along the exterior of the hopper rear wall 272, a shutter control rod 410 projects through lower slot 408 and the apertured lug 406. The upper end 412 of rod 410 is bent forward approximately ninety degrees and projects through the upper circular platform slot 404. The lower end 414 of control rod 410 is bent laterally approximately ninety degrees and projects through the apertured shutter bracket 384. Note, control rod 410 is assembled in the combined support 386 before the support is mounted and secured on the hopper, and prior to securing the assembled support 386 and control rod 410 on the hopper rear wall 272, the lower control rod end 414 is fitted through the shutter bracket 384. When rod 410 and support 386 are secured as an assembly on the hopper, rod 410 is maintained in position by cooperation between upper end 412 and the sides of upper slot 404, the guiding relationship of rod 410 in the aperture of support lug 406, and the fore and aft retention of lower control rod end 414 in the aperture of shutter bracket 384. The control rod 410 cannot be removed from assembled position without disassembly or deliberate deformation of a spreader component. A cotter pin 416 and washer 418 are placed on lower rod end 414, and tend to hold the rod end 414 at a right angle to the shutter bracket 384 and this in turn holds the upper end 412 in a straight position in slot 404 where it strikes the rate cam, and provide increased overall accuracy.

Welded to the control rod 410, just below upper end 412, is a rearwardly disposed, laterally apertured lug 420. A compression spring 422, encircling rod 410, is stressed between control rod lug 420 and support lug 406 to bias control rod 410 upwardly. The upwardly directed spring bias on control rod 410 will tend to move shutter 380 to a position which will uncover the hopper outlet apertures 350.

A flat apertured cam 424 with a spiral cam edge 426 is rotatably mounted on the threaded stud 394 and against platform 392. Cam 424 is of sufficient dimension to be disposed over the upper slot 404 in the support platform 392. So positioned, the portion of cam edge 426 immediately below stud 394 will serve as an upper limit abutment for the upper control rod end 412 when rod 410 moves upward under spring bias. This control rod, and hence outlet control, limit can be varied by rotating the cam 424 on stud 394, and when a desired outlet opening position of shutter is determined the cam 424 can be clamped in position by tightening a wing nut 428 and washer 430 on threaded stud 394. The rise of cam edge 426 terminates in a radial pointer 432 which can be used in cooperation with indicia graduations placed around the circular platform 392 to enable adjustment to predetermined shutter positions by merely rotating the cam 424 to a marking corresponding to a known outlet opening setting and clamping it in position.

The means for moving shutter 380, between a position covering all hopper outlet apertures 350 and a spring biased position uncovering a forward portion of all hopper outlet apertures 350 as determined by cooperation between the control rod 410 and cam 424, is essentially the same as disclosed in the aforementioned Reissue Patent No. 24,189. It consists of an operating lever 434 with upper arm 436, fitted with a knob 438, and a lower arm 440 having an apertured end 42, and an operating rod 444.

Lever 434 is pivotally mounted (FIGURES 1 and 8) intermediate its ends on the side of handle assembly bracket 376 which is substantially vertically aligned with the side of tubular handle member 366, as by a bolt 446 and lock nut 448 cooperatively tightened to retain the lever 434, yet enable its free pivotal movement, on the bolt 446.

Operating rod 444 has its upper and lower ends, 450 and 452 laterally bent. The upper operating rod end 450 is pivotally fitted through the apertured end 442 of lower control lever arm 440 a sufficient distance to project laterally below the tubular handle member 366. Rod end 450 is retained in lever arm 440 by a washer 454 and cotter pin. The lower end 452 of operating rod 444 is pivotally fitted through the apertured control rod lug 20 and retained by a cotter pin.

When control lever 434 is moved to a position, as illustrated in FIGURE 8, where the bent end 450 of operating rod 444 engages the under side of tubular handle member 366, operating rod 444 and control rod 410 have been forced in a downward direction against the bias of spring 22 to a position in which shutter 380 has pivoted over and closed the row of outlet apertures 350. In such position, operating rod upper pivot end 450 has moved past a dead center position between the control lever pivot bolt 446 and the lower operating rod pivot end 452, providing an overcenter locking movement in the control linkage which prevents spring biased movement of the shutter 380 to an outlet open position.

To open the hopper discharge outlets 350 an operator moves the lever arm 436 up by means of knob 438. This action moves lower lever arm down until the operating rod upper pivot end 450 moves down overcenter, whereupon the bias of spring 422 will force the lever 434, operating rod 444, control rod 410 and shutter 380 to the outlet open position as determined by the adjustment of rate cam 24 for abutment by control rod upper end 412.

In the foregoing description there is provided novel spreader construction in which the formed sheet metal leg and the combining of support leg structure with outlet rate adjustment mechanism enables production and assembly savings and certain changes in operative location and shape of control members enable a convenience of operation for the user.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A wheel supported spreader comprising: a hopper with a handle; discharge opening means; an outlet shutter means adapted to close said discharge opening means in one position and to open said discharge opening means in a number of other positions; control means for said shutter movable to a fixed locking position holding said shutter in closed position and movable away from said locking position to a plurality of positions corresponding to said open positions, said control means comprising a pivotable link mechanism mounted on said handle and connecting means between said linkage mechanism and said shutter means, a support means secured to the rear wall of said hopper comprising a portion extending above the rear top edge of said hopper, an adjustable member mounted on said top portion of said support bracket limiting the movement of said control means in each of said adjusted open positions of said shutter means, and spring means acting to hold said control means and shutter in said fixed locking position with the shutter in said closed position and also acting to hold said shutter in each of its adjusted set positions.

2. A spreader as defined in claim 1, wherein said support bracket has a downwardly extended portion constituting a support leg for said spreader.

3. A spreader for distributing material comprising a wheeled hopper having material distribution means with an adjustable outlet means movable between closed and open positions; an adjustable stroke control mechanism mounted on said hopper and connected to control movement of said outlet means toward selected open positions permitting material discharge; resilient means biasing the outlet means toward open position; structural means fixed to said hopper for moving said spreader; an operating means for said outlet means fixed on said structural means and including a pivotable kinematic linkage connected to said outlet means, said pivotable kinematic linkage being operatively shiftable to a limit position wherein the operating means is self-maintained to keep said outlet means in a closed nondischarging position against said resilient biasing force; said adjustable stroke control mechanism including bracket means secured to the rear wall of said hopper and a ground engaging support leg device connected to and extending downwardly from said bracket.

4. A spreader as defined in claim 3, wherein said bracket means is a unitary bracket having an integral downwardly extending lower portion constituting said support leg device.

5. A spreader as defined in claim 3, wherein said bracket means has an upper portion extending beyond the top edge of said rear wall, and said adjustable stroke control mechanism further includes an adjustable cam plate disposed on the front side of said upper portion.

6. A spreader as defined in claim 5, wherein said adjustable stroke mechanism and resilient biasing means comprise: a link member connected at its lower end to said outlet means, passing through a guide member on said support bracket means and having an upper end formed as a forwardly projected lug disposed through a slot in said upper portion of said bracket means; and a spring means disposed between said linkage member and said bracket means to bias said linkage member so its upper end lug is urged toward abutment against said cam plate.

7. For use in combination with a material distribution spreader having adjustable outlet control means, a combined adjustable outlet rate control and ground support bracket comprising: a sheet metal member having a flat intermediate portion with flanged sides and a rearwardly curved leg portion having side flanges integral therewith and with the side flanges of said intermediate portion, said side flanges of said leg portion passing and being integral around the end of said leg portion; an elongate slot formed in said upper portion and an elongate slot formed in said curved portion adjacent said intermediate portion, both of said slots extending longitudinally and approximately centered in said member and adapted to receive portions of a rate control link.

8. The combined adjustable outlet rate control and ground support bracket as defined in claim 7, wherein a rate control spring abutment member is located on said bracket between said flanges and intermediate said two elongate slots.

9. A spreader for distributing material including: a hopper; a pair of ground engaging wheels on a common axis, one wheel disposed on each side of said hopper; material distribution means with outlet control; structural means fixed to said hopper for moving the spreader; a bracket including one rearwardly disposed sheet metal leg including an integral continuous flange along its sides and around its foot; means rigidly securing said bracket to a wall of said hopper; and a rate control mechanism mounted on said bracket and connected to said outlet control.

10. A wheel supported spreader comprising: a hopper with a handle; discharge opening means; an outlet shutter means adapted to close said discharge opening means in one position and to open said discharge opening means in a number of other positions; control means for said shutter movable to a fixed locking position holding said shutter in closed position and movable away from said locking position to a plurality of positions corresponding to said open positions, said control means comprising a pivotable link mechanism mounted on said handle and connecting means between said linkage mechanism and said shutter means, an adjustable rate mcehanism secured to a wall of said hopper comprising a scale plate portion with a circular scale thereon and a slot formed in said portion substantially radially disposed relative to the center of the circular scale; a portion of said connecting means extending through said slot; an adjustable spiral cam member mounted on said scale plate portion limiting the movement of said control means in each of said adjusted open positions of said shutter means, and spring means acting to hold said control means and shutter in fixed said locking position with the shutter in said closed position and also acting to hold said shutter in each of its adjusted set positions.

11. A spreader for distributing material comprising a wheeled hopper having material distribution means with an adjustable outlet means movable between closed and open positions; an adjustable stroke control mechanism mounted on said hopper and connected to control movement of said outlet means toward selected open positions permitting material discharge; resilient means biasing the outlet means toward open position; structural means fixed to said hopper for moving said spreader; an operating means for said outlet means fixed on said structural means and including a pivotable kinematic linkage connected to said outlet means, said pivotable kinematic linkage being operatively shiftable to a limit position wherein the operating means is self-maintained to keep said outlet means in a closed nondischarging position against said resilient biasing force; said adjustable stroke control mechanism including a spreader support leg bracket device secured to a wall of said hopper having a scale plate portion provided with a circular scale and a rotatably adjustable cam device pivotally mounted on an axis centered relative to said circular scale.

12. A spreader as defined in claim 11, wherein said adjustable stroke mechanism and resilient biasing means comprise: a link member connected at its lower end to said bracket device and having an upper end formed as a projected lug disposed through a slot in said scale plate portion of said bracket device; and a spring means disposed between said linkage member and said bracket device to bias said linkage member so its upper end lug is urged toward abutment against said device cam.

13. For use in combination with a material distribution spreader having adjustable outlet control means, an adjustable outlet rate control comprising: a sheet metal member having a flat scale plate portion, with a circular scale thereon, an elongate slot formed in said scale plate portion extending radially relative to the center of said scale, a spiral cam, means adjustably securing said spiral cam on the scale plate portion for movement about an axis located in the center of said circular scale, an abutment means extending through said slot, and means on said member engaging and reciprocally guiding said abutment means for movement parallel to the elongate extent of said slot.

14. For use in a material dispensing spreader having a mechanism for variable adjustment of the dispensing rate, an adjustment device comprising bracket means for attachment to a spreader hopper including a flat scale plate with a scale arranged in a circular manner thereon, a slot in said plate, an adjusting peripheral cam edged plate pivotally secured on said plate on an axis centrally of said scale and overlapping said slot, releasable clamping means between said cam plate and said scale plate, an abutment member with a portion extending through said slot, and resilient means connected between said bracket means and said abutment member, urging said abutment portion in a direction toward engagement with the peripheral edge of said cam plate.

References Cited in the file of this patent

UNITED STATES PATENTS

| | | |
|---|---|---|
| 2,735,582 | Wilson | Feb. 21, 1956 |
| 2,767,887 | Bond et al. | Oct. 23, 1956 |
| 2,796,203 | Masters et al. | June 18, 1957 |
| 2,801,772 | Schiebel | Aug. 6, 1957 |
| 2,874,880 | Schiebel | Feb. 24, 1959 |

UNITED STATES PATENT OFFICE
CERTIFICATE OF CORRECTION

Patent No. 3,015,416　　　　　　　　　　　　January 2, 1962

Virgil H. Peoples et al.

It is hereby certified that error appears in the above numbered patent requiring correction and that the said Letters Patent should read as corrected below.

Column 5, line 61, for "42" read -- 442 --; column 6, line 3, for "20" read -- 420 --; line 9, for "22" read -- 422 --; line 24, for "24" read -- 424 --; column 8, line 40, for "device cam" read -- cam device --.

Signed and sealed this 8th day of May 1962.

(SEAL)
Attest:

ERNEST W. SWIDER
Attesting Officer

DAVID L. LADD
Commissioner of Patents